United States Patent
Bastide et al.

(10) Patent No.: US 11,483,472 B2
(45) Date of Patent: Oct. 25, 2022

(54) ENHANCING QUALITY OF MULTIMEDIA

(71) Applicant: INTERNATIONAL BUSINESS MACHINES CORPORATION, Armonk, NY (US)

(72) Inventors: Paul R. Bastide, Ashland, MA (US); Robert E. Loredo, North Miami Beach, FL (US); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/208,045

(22) Filed: Mar. 22, 2021

(65) Prior Publication Data

US 2022/0303459 A1   Sep. 22, 2022

(51) Int. Cl.
*H04N 5/232* (2006.01)
*G06N 20/00* (2019.01)
(Continued)

(52) U.S. Cl.
CPC ......... *H04N 5/23222* (2013.01); *G06N 20/00* (2019.01); *G06V 20/41* (2022.01);
(Continued)

(58) Field of Classification Search
CPC ......... H04N 5/23222; H04N 21/23424; H04N 21/23418; G06V 10/255; G06V 10/40;
(Continued)

(56) References Cited

U.S. PATENT DOCUMENTS 8,964,025 B2   2/2015  Cudak
9,467,750 B2 * 10/2016  Banica ............. H04N 21/23412
(Continued)

FOREIGN PATENT DOCUMENTS

| CN | 103428460 A | * 12/2013 | ............... G06T 3/40 |
| WO | WO-2012164360 A1 | * 12/2012 | ....... H04N 21/23439 |
| WO | 2016183011 A1 | 11/2016 | |

OTHER PUBLICATIONS

IBM, List of IBM Patents or Patent Applications Treated as Related, Appendix P, dated Mar. 25, 2021, 2 pages.
(Continued)

*Primary Examiner* — John Villecco
(74) *Attorney, Agent, or Firm* — David Spalding

(57) ABSTRACT

A computer-implemented method, a computer system and a computer program product enhance multimedia quality. The method includes receiving a plurality of sequential frames of a scene in a video. The method also includes generating dataframes for current frames and for a reference frame of the video. The method further includes comparing the dataframes for the reference and current frames. In addition, the method includes determining a quality metric of the current frames based on the comparison of the dataframes for the reference and current frames. The method also includes determining if the quality metric can be improved by altering the video in response to determining that the quality metric of one of the current frames is below a threshold. Finally, the method includes inserting expansion frames into the video in response to determining that the quality metric can be improved by altering the video.

20 Claims, 12 Drawing Sheets

(51) Int. Cl.
  *H04N 5/222* (2006.01)
  *G06V 20/40* (2022.01)
(52) U.S. Cl.
  CPC ........... *G06V 20/46* (2022.01); *H04N 5/2222* (2013.01); *H04N 5/232939* (2018.08)
(58) Field of Classification Search
  CPC ...... G06V 10/70; G06V 10/764; G06V 10/82; G06V 10/84; G06V 20/41; G06V 20/46; G06V 10/993
  See application file for complete search history.

(56) References Cited

U.S. PATENT DOCUMENTS

| | | | |
|---|---|---|---|
| 9,894,130 B2 * | 2/2018 | Hassan | H04L 65/762 |
| 10,127,644 B2 | 11/2018 | Taggart | |
| 10,186,297 B2 | 1/2019 | Kolarov | |
| 11,282,179 B2 * | 3/2022 | Vu | G06V 10/82 |
| 2003/0023910 A1 * | 1/2003 | Myler | H04N 17/004 |
| | | | 714/704 |
| 2011/0301447 A1 | 12/2011 | Park | |
| 2013/0308004 A1 | 11/2013 | Liu | |
| 2015/0161469 A1 | 6/2015 | Bocharov | |
| 2015/0220806 A1 | 8/2015 | Heller | |
| 2015/0334156 A1 * | 11/2015 | Juilliart | H04N 7/15 |
| | | | 348/14.12 |
| 2016/0088054 A1 * | 3/2016 | Hassan | H04N 21/8456 |
| | | | 709/219 |
| 2017/0085945 A1 * | 3/2017 | Kulkarni | H04N 5/20 |
| 2017/0318337 A1 * | 11/2017 | Kulkarni | H04N 5/20 |
| 2018/0005449 A1 * | 1/2018 | Wallner | G06T 15/205 |
| 2020/0005831 A1 * | 1/2020 | Wallner | G11B 27/031 |
| 2020/0327156 A1 | 10/2020 | Mestres | |
| 2021/0295096 A1 * | 9/2021 | Vu | G06T 7/0002 |
| 2021/0295493 A1 * | 9/2021 | Vu | G06V 20/41 |

OTHER PUBLICATIONS

Pending U.S. Appl. No. 17/207,998, filed Mar. 22, 2021, entitled, "Multimedia Quality Evaluation,",51 pages.
Pending U.S. Appl. No. 17/208,030, filed Mar. 22, 2021, entitled, "Improving Quality of Multimedia,", 50 pages.
Daily Motion, "Loose Cannon the Massacre War of God, Episode 1LC40," [accessed Aug. 24, 2020], 3 pages, <https://www.dailymotion.com/video/x3kri7b>.
Damera-Venkata, et al., "Image Quality Assessment Based on a Degradation Model," IEEE Transactions on Image Processing, vol. 9, No. 4, Apr. 2000, pp. 636-650.
Disclosed Anonymously, "Method and System for Automatically Optimizing a Caption Position with a Video Frame," IP.com, IPCOM000256150D, Nov. 8, 2018, 3 pages.
Egiazarian, et al., "A New full-reference quality metrics based on HVS," Jan. 2006, 5 pages, <https//www.researchgate.net/publication/251229783>.
International Telecommunications Union, "ITU-T P.910 Telecommunication Standardization Sector of ITU," Apr. 2008, 42 pages.
Maio, "Rules of Shot Composition in Film: A Definitive Guide," Apr. 1, 2019, 41 pages, <https://www.studiobinder.com/blog/rules-of-shot-composition-in-film>.
Media College, "Focus Pull," [accessed Aug. 25, 2020], 2 pages, <https://www.mediacollege.com/video/camera/focus/pull.html>.
Mell et al., "The NIST Definition of Cloud Computing," National Institute of Standards and Technology, Special Publication 800-145, Sep. 2011, pp. 1-7.
Miyahara, et al., "Objective picture quality scale (PQS) for image coding," IEEE Transactions on Communications, vol. 46, No. 9, Sep. 1998, pp. 1215-1226.
OpenCV, "Getting Started with Videos—OpenCV-Python Tutorials," [accessed Aug. 19, 2020], 3 pages, <https://opencv-python-tutroals.readthedocs.io/en/latest/py_tutorials/py_gui/py_video_display/py_video_display.html>.
Ponomarenko, et al., "On Between-Coefficient Contrast Masking of DCT Basis Functions," Jan. 2007, 5 pages, <https://www.researchgate.net/publication/242309240>.
Rosebrock, "Blur Detection with OpenCV," [accessed Aug. 20, 2020], 79 pages, <https://www.pyimagesearch.com/2015/09/07/blur-detection-with-opencv/>.
Sheikh, et al., "Image Information and Visual Quality," IEEE Transactions on Image Processing, vol. 15, No. 2, Feb. 2006, pp. 430-444.
Solomon, et al., "Visibility of DCT basis functions: Effects of contrast masking," IEEE Xplore, [accessed Feb. 2, 2021], pp. 361-370, https://ieeexplore.ieee.org/document/305944>.
Stack Overflow, "How to Handle Occlusion and Fragmentation," [accessed Aug. 20, 2020], 3 pages <https://stackoverflow.com/questions/16232398/how-to-handle-occlusion-and-fragmentation>.
Video Clarity, "RTM—Real-Time Quality Monitoring," [accessed Aug. 24, 2020], 8 pages, <https://videoclarity.com/video-monitoring/>.
Wang, et al., "A universal image quality index," IEEE Signal Processing Letters, vol. 9, No. 3, Mar. 2002, pp. 81-84.
Wang, et al., "Image Quality Assessment: From Error Visibility to Structural Similarity," IEEE Transactions on Image Processing, vol. 13, No. 4, Apr. 2004, pp. 600-612.
Weaver, "Split-Video-By-Frame.py," [accessed Aug. 20, 2020], 4 pages, <https://gist.github.com/keithweaver/70df4922fec74ea87405b83840b45d57>.
Wikipedia, "Comparison of Video Container Formats," [accessed Aug. 20, 2020], 7 pages, <https://en.wikipedia.org/wiki/Comparison_of_video_container_formats>.
Xiao, "DCT-based Video Quality Evaluation," Final Project for EE392J, Winter 2000, 10 pages.

* cited by examiner

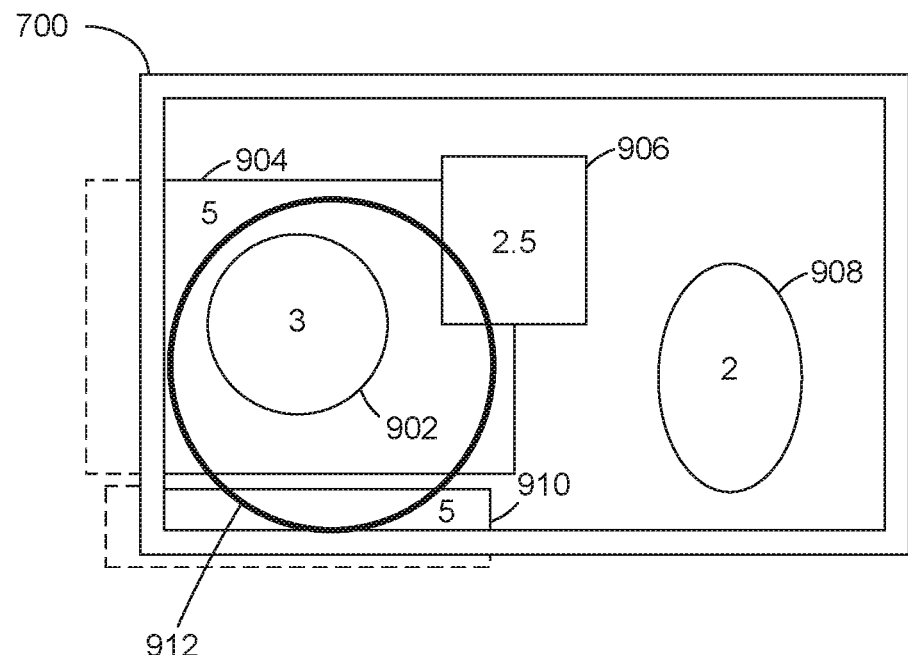
FIG. 9
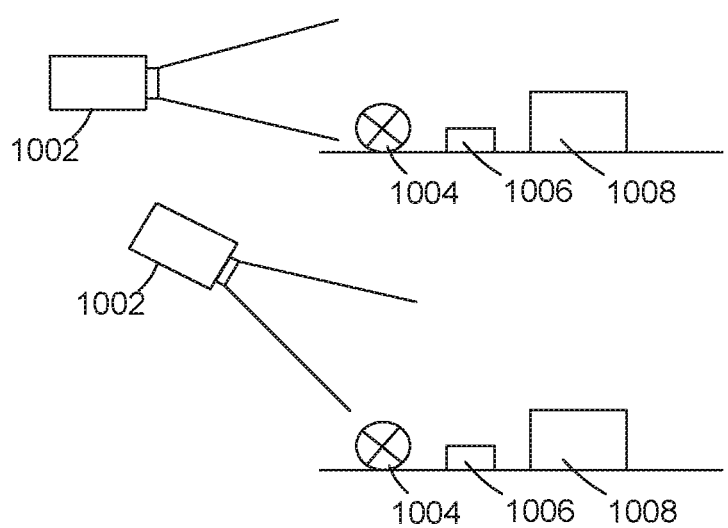
FIG. 10A
FIG. 10B

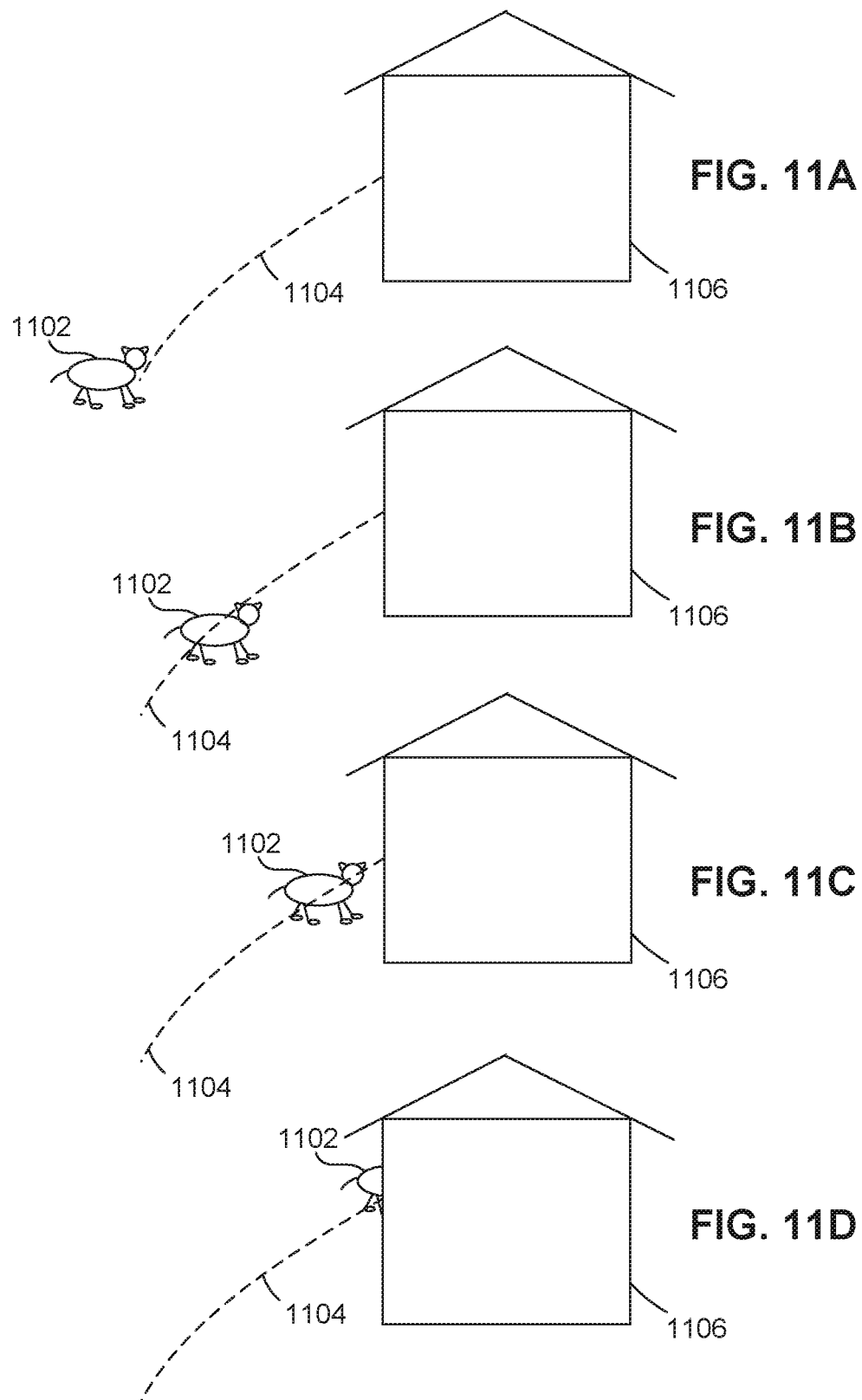

ENHANCING QUALITY OF MULTIMEDIA

BACKGROUND

Embodiments of the present invention relate generally to video quality evaluation, and, more specifically, to quality evaluation and remediation of recorded and live video.

The rise of the Internet in modern society has facilitated a proliferation of online platforms that support user-produced video content. Anyone with a video camera now has the tools to produce video recordings themselves and upload for the world to see. Parallel to this development, there are many software applications available on the Internet for computers to detect objects in videos and analyze both audio and video for quality.

SUMMARY

An embodiment is directed to a computer-implemented method for enhancing multimedia quality. The method may include receiving a plurality of sequential frames of a scene in a video. The method may also include generating dataframes for current frames and for a reference frame of the video. The method may further include comparing the dataframes for the reference and current frames. In addition, the method may include determining a quality metric of the current frames based on the comparison of the dataframes for the reference and current frames. The method may also include determining if the quality metric can be improved by altering the video in response to determining that the quality metric of one of the current frames is below a threshold. Finally, the method may include inserting expansion frames into the video in response to determining that the quality metric can be improved by altering the video.

In an embodiment, the method may include receiving a plurality of videos and interaction data associated with frames of the respective plurality of videos. The method may also include generating dataframes for the frames of the video and for one or more reference frames of the video for each of the received plurality of videos. The method may further include comparing the dataframes for the frames of the video with a corresponding reference frame for each of the received plurality of videos. In addition, the method may include determining a quality metric for the frames of the video based on the comparison of the dataframes for the frames of the video with a corresponding reference frame and on interaction data associated with the respective frame for each of the received plurality of videos. The method may further include classifying each of the plurality of the received videos by type. Finally, the method may include training a machine learning model with the received plurality of videos, the respective determined quality metrics, and respective classifications. The determining a quality metric of the current frame may be further based on the machine learning model.

In an embodiment, the method may include generating explanatory information. In further embodiments, the explanatory information may be textual explanatory information and the method may include superimposing the textual explanatory information on a plurality of the expansion frames. In other embodiments, the explanatory information may be audio explanatory information and the method may include attaching the audio explanatory information to a plurality of the expansion frames.

In an embodiment, the expansion frames may be inserted into the video after a last good frame.

In further embodiments, the plurality of sequential frames of a scene in a video may be received from a camera at a time of capture and the method may further include generating a notification to change a position of the camera in response to determining that the quality metric cannot be improved by altering the video. In an embodiment, the generating a notification to change a position of the camera may include determining a center of likely user focus. In addition, the method may include illuminating a border around the center of likely user focus on the camera screen. In another embodiment, the illuminating a border around the center of likely user focus comprises projecting the border using a light source.

In addition to a computer-implemented method, additional embodiments are directed to a system and a computer program product for displaying a custom food establishment menu.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 depicts a display device rendering objects scored according to likelihood of viewer focus according to various embodiments.

FIGS. 10A and 10B illustrate an example in which an alert may be generated to move a camera to clear an obstruction in a video according to an embodiment.

FIGS. 11A-D illustrate another example in which an alert may be generated to move a camera to clear an obstruction in a video according to an embodiment.

DETAILED DESCRIPTION

Figure 1:
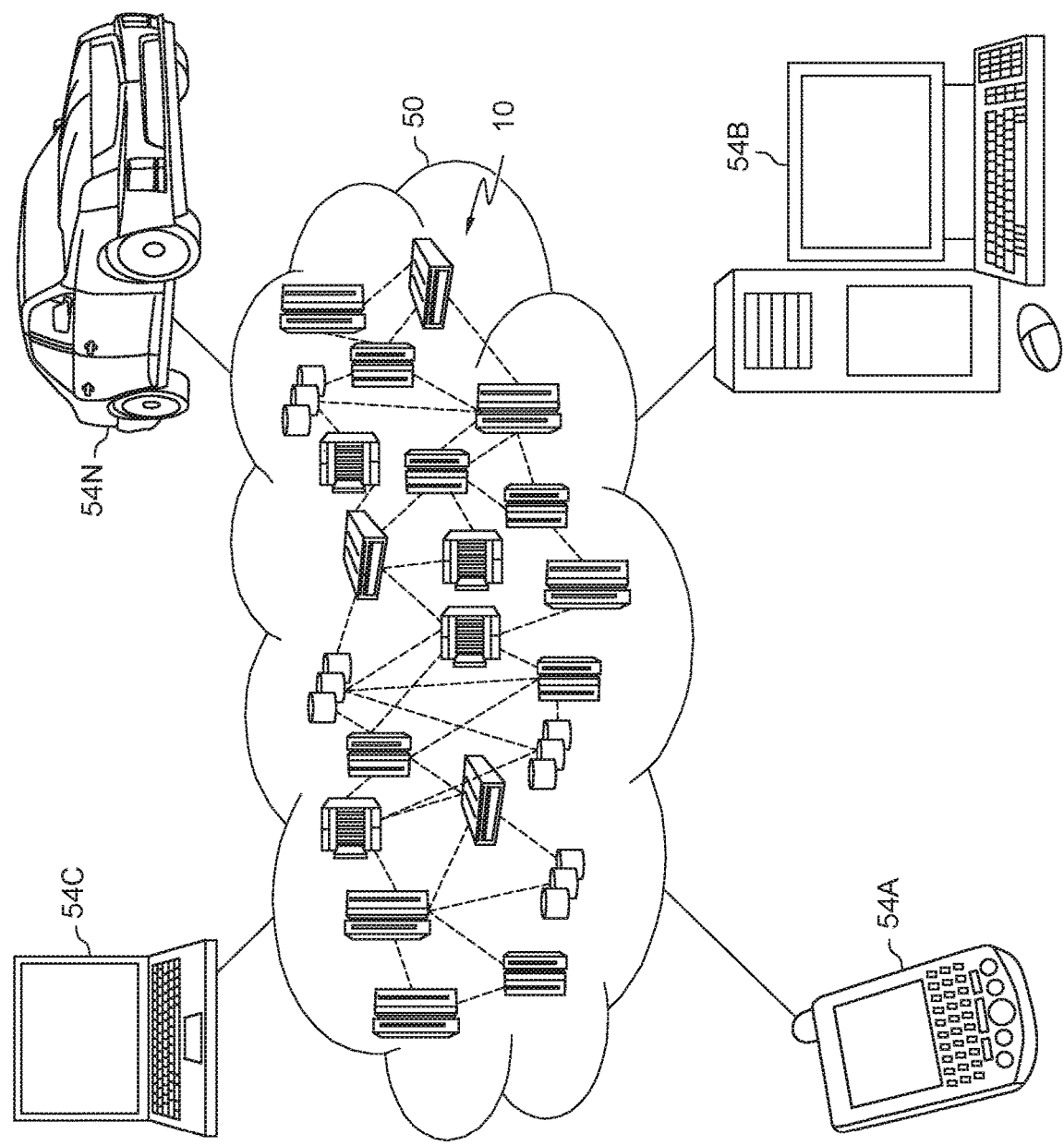
FIG. 1 depicts a cloud computing environment according to an embodiment of the present invention.

Many online videos are shot with either a stationary tripod or a handheld camera, e.g., with a smart phone, where the presenter has the camera angled to illustrate a specific object of interest, i.e., an area that a viewer focuses on. These videos often have some obstruction (or obscuration), such as the instructor's hands hiding the object of interest or movement of the object of interest outside the frame of the video, or environment glare from the lighting as the object of interest is moved around. Although instructional videos are the most frequent examples that exhibit problems, the issue is not limited to instructional videos.

Another example of this problem is glare, where the lighting of all or part of the scene may conflict with the ability to view the entire scene. In yet another example, objects within the video, such as an instructor's hands or head, may block the action being described. If the camera were in a different position, the video may be clearer, and the quality of the video improved. In an additional example, the object of discussion in the video may be moved partially or completely out of frame. This can occur when an instructor moves the object or the camera without realizing the object is partially or completely out of frame until after the recording is completed when reviewing prior to publishing. Accordingly, there is a need to improve the viewing experience of multimedia. According to various embodiments, methods and systems are provided to improve the quality of an instance of multimedia (video, still images, graphics, audio, and text). The methods and systems may improve the multimedia at the time of recording or capture, or subsequent to capture before the multimedia is published or shared, such as on a video sharing platform.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
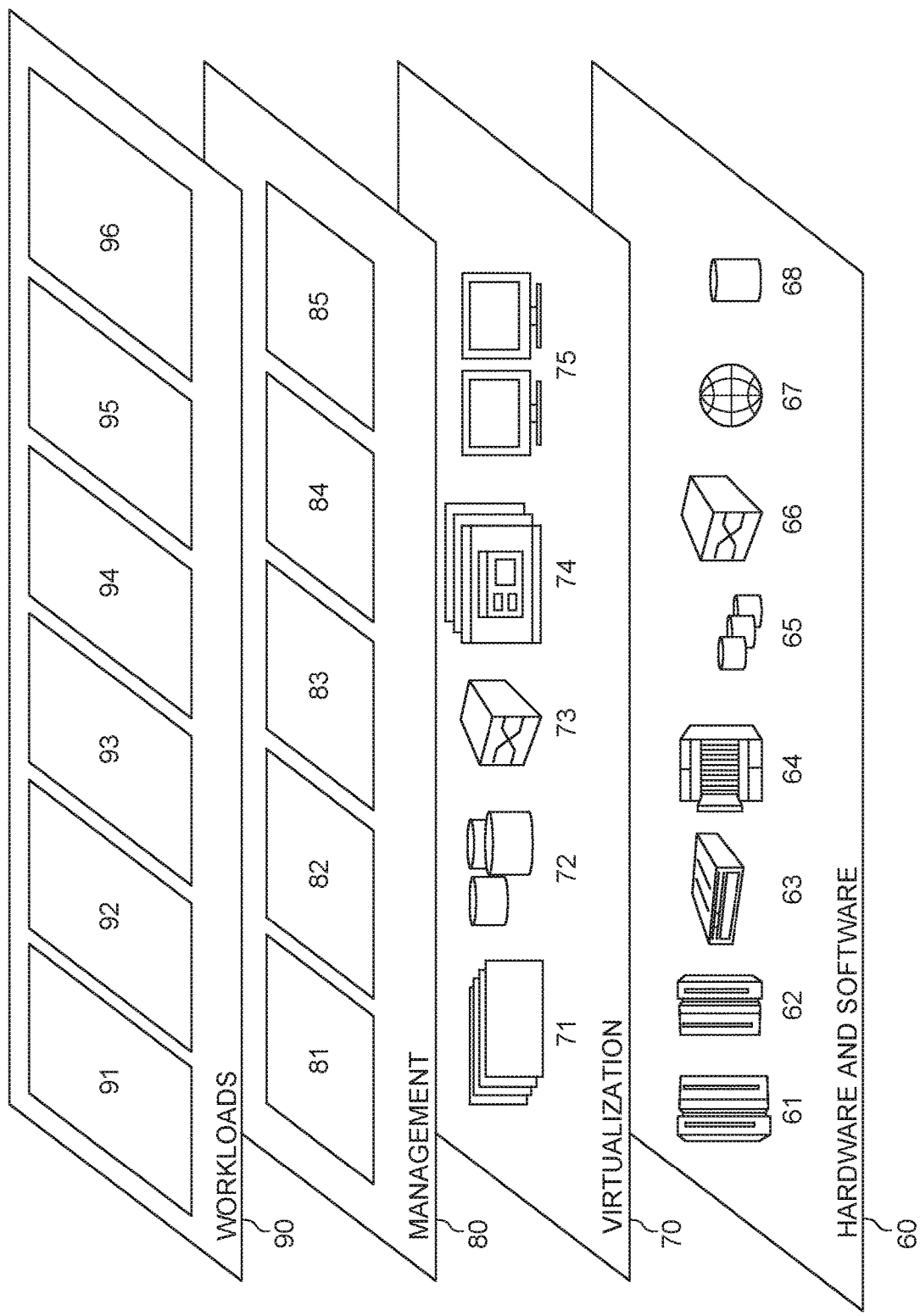
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96 such as the video remediation module 320.

Figure 3:
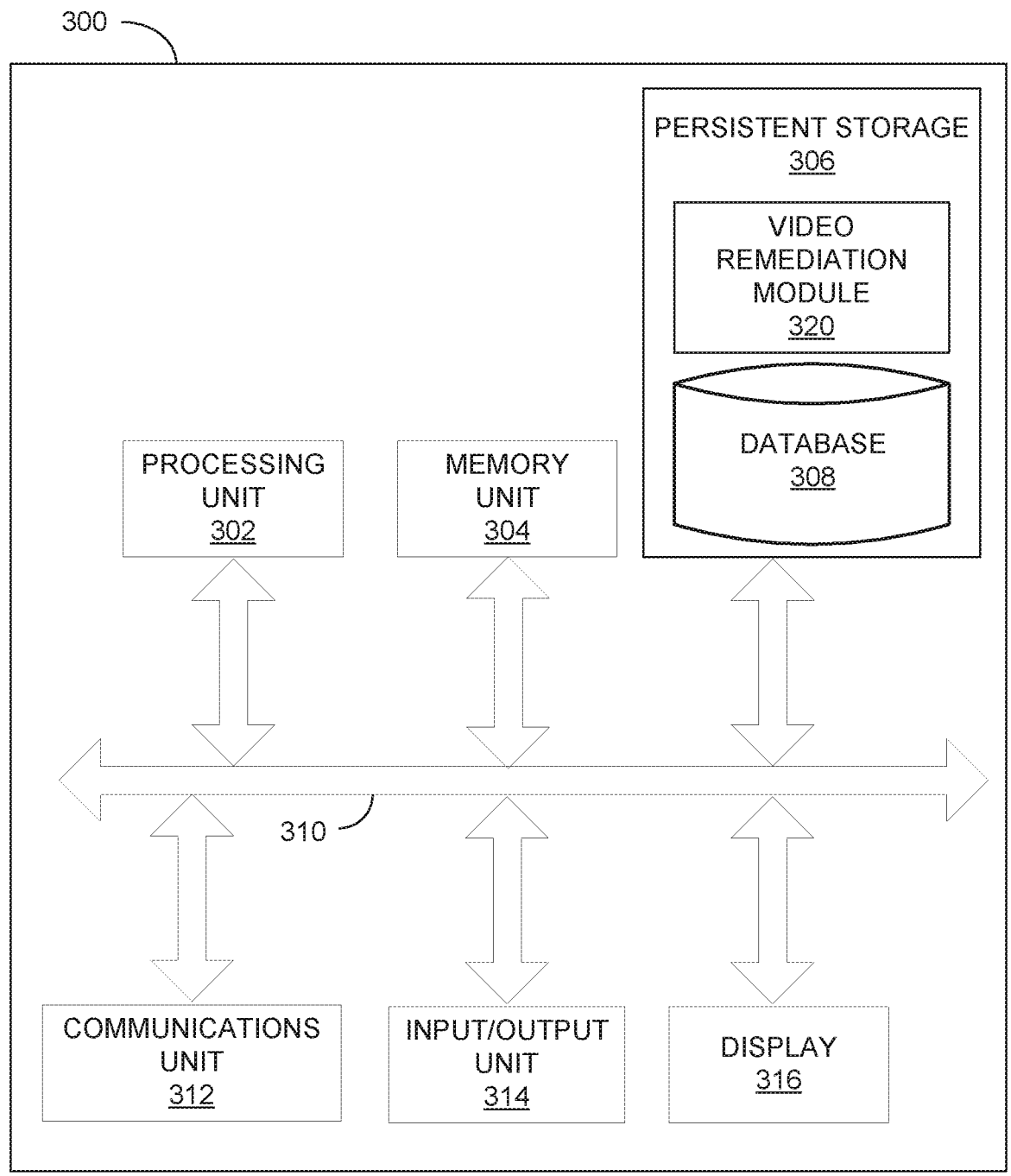
FIG. 3 is a block diagram of an example computer system including persistent storage which may be implemented according to an embodiment.

Referring to FIG. 3, there is shown a block diagram illustrating a computer system according to an embodiment. A smart phone may include an instance of computer system 300. Embodiments may be implemented as part of a smart phone, digital camera, or other device, which may include an instance of computer system 300, or as an added feature of digital recording software. In addition, while not shown in FIG. 3, the computer system 300 may include an image sensor or camera for capturing images and a sound sensor or microphone for capturing audio. As shown, a computer system 300 includes a processor unit 302, a memory unit 304, a persistent storage 306, a communications unit 312, an input/output unit 314, a display 316, and a system bus 310. Computer programs such as video remediation module 320 are typically stored in the persistent storage 306 until they are needed for execution, at which time the programs are brought into the memory unit 304 so that they can be directly accessed by the processor unit 302. The processor unit 302 selects a part of memory unit 304 to read and/or write by using an address that the processor 302 gives to memory 304 along with a request to read and/or write. Usually, the reading and interpretation of an encoded instruction at an address causes the processor 302 to fetch a subsequent instruction, either at a subsequent address or some other address. The persistent storage 306 mat store a database 308. The processor unit 302, memory unit 304, persistent storage 306, communications unit 312, input/output unit 314, and display 316 interface with each other through the system bus 310.

Figure 4A:
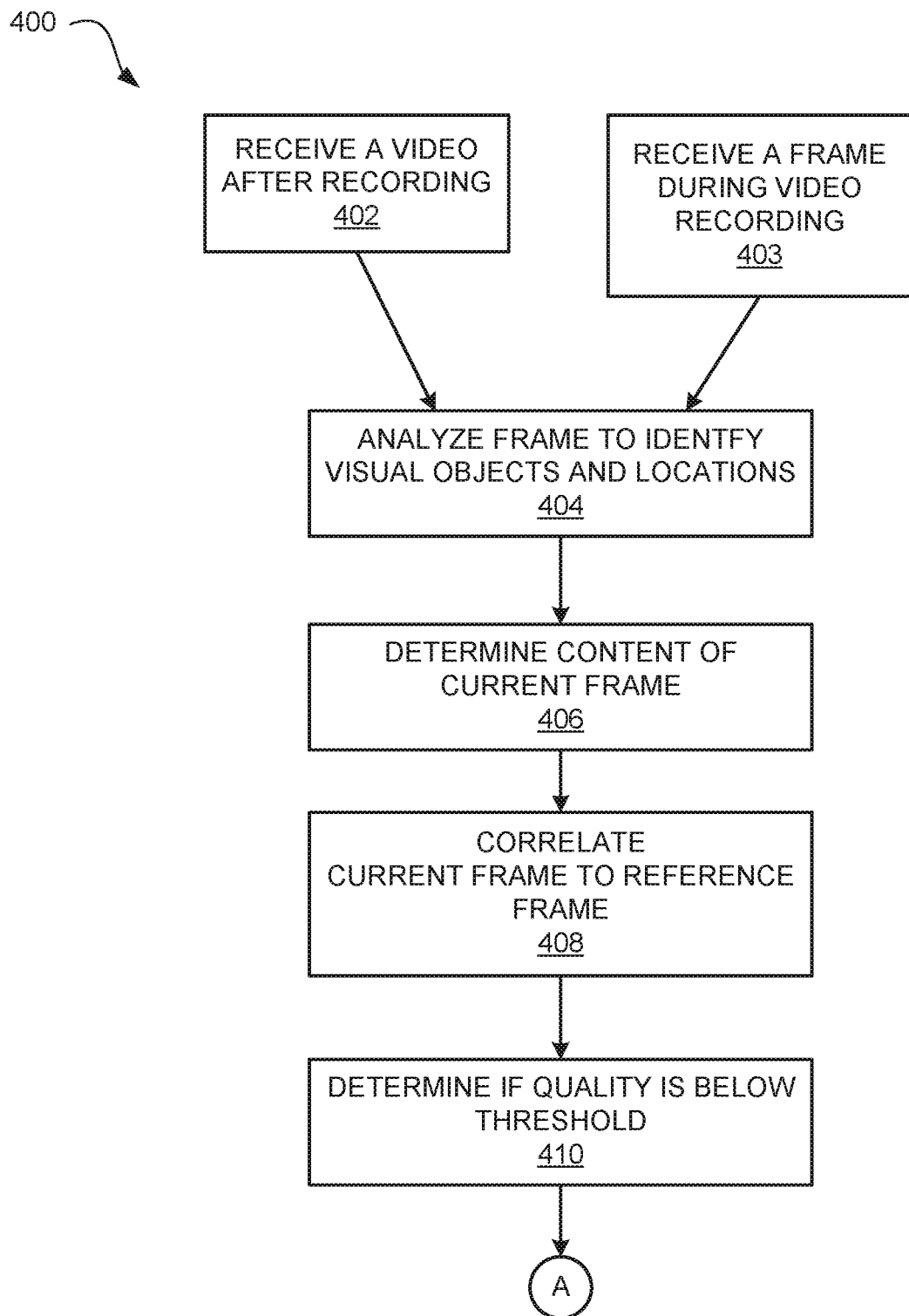
FIGS. 4A and 4B show a flow chart of a process for evaluation and remediation of live and recorded video in accordance with one or more embodiments.
Figure 4B:
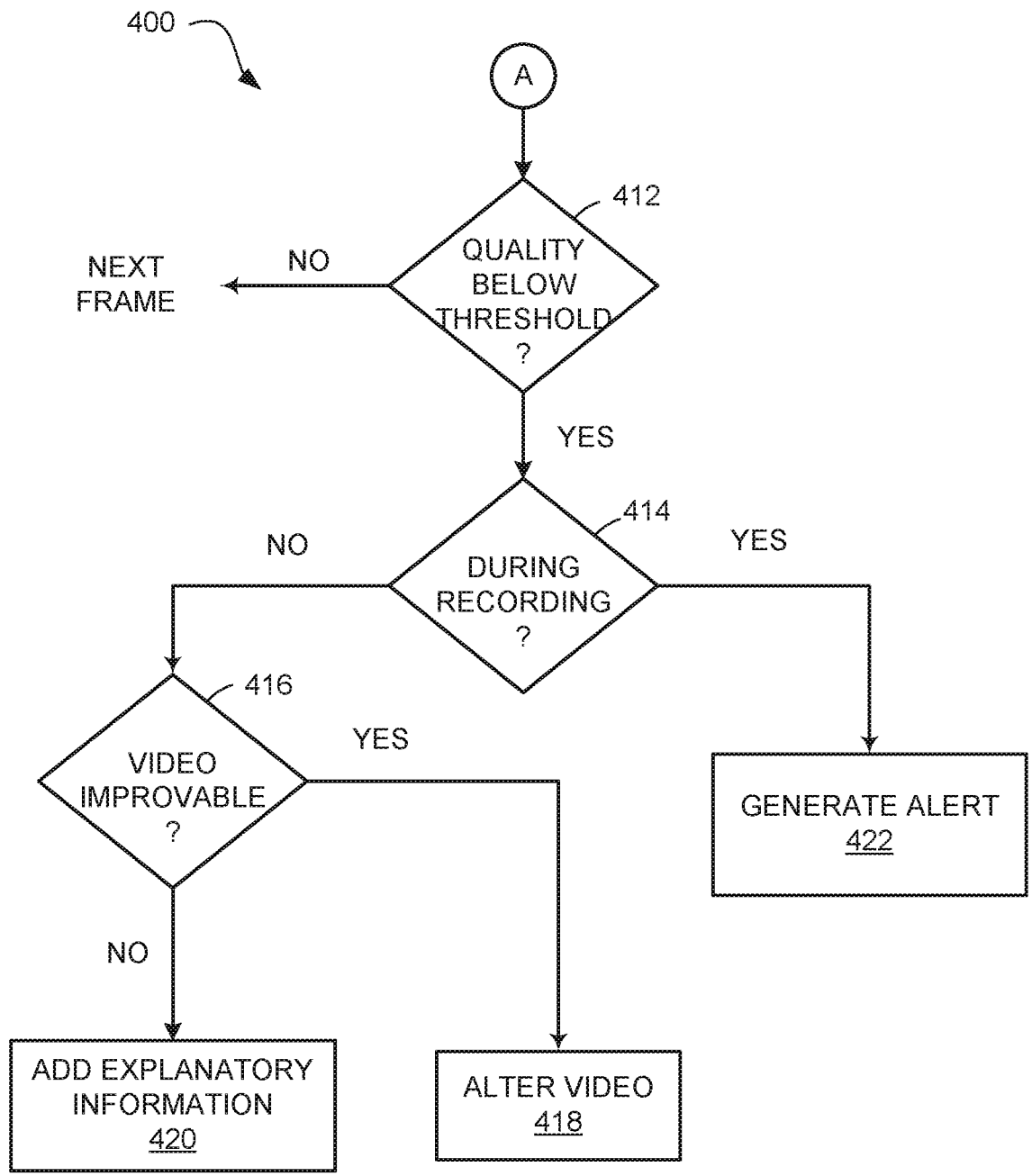

Referring now to FIGS. 4A and 4B, a flow chart of a process 400 for multimedia quality evaluation and possible remediation in accordance with one or more embodiments is shown. The method 400 may be used after a video is recorded or during recording. At 402, a previously recorded video may be received. At 403, a frame of video currently being recorded is received.

The video may be in an intermediate format, such as MP4 or WEBM or any of several various container formats. In a streaming process or once in the intermediate format, each video may be split into a sequence of images and frames based on the frame rate of the recording, e.g., 23.9, 30, or 60 frames per second. The frame rate may be used to normalize the impacts of changes relative to one image.

At 404, a frame of the previously recorded video or video currently being recorded is analyzed. The analysis identifies objects in the frame. Objects may be identified using known neural network classification methods. For example, if the frame contains electronic components such as wires, resistors, capacitors, transistors, logic chips, and a circuit board, the various components may be identified using image recognition techniques. Other examples of objects that may be identified include ingredient packages or containers in an instructional cooking video or keys and frets in a musical instrument instructional video. The location of each object in the frame is also determined.

Image and audio data may be extracted from the frame and stored in cloud object storage or any appropriate storage format such that they may be subsequently loaded into a video processing library such as OpenCV. The extracted audio may be segmented into individual utterances and correlated with the time-ordered sequence of the images. In addition to collecting the video and audio files themselves, other data from the video frames may be extracted, such as a title of the video, user reactions or comments, and the like.

At 406, the content of the frame is determined. The analysis in operation 404 identifies (or names) visual objects and their locations but does not determine the concept or idea the frame is showing. Analysis operation 404 does not explain how the identified objects are related to each other, or to the topic or subject of the video, or even what the subject of the video is. In operation 406, audio from the video is analyzed. A speech-to-text algorithm may generate a transcript of audio extracted from the video and semantic analysis may be performed on the transcript to correlate concepts, topics, and explanations with particular segments of the video. Audio closely correlated in time with the current frame may be analyzed to determine what a narrator or speaker is saying with respect to the current frame. If the audio includes a speaker referring to a resistor, it may be determined that one of the objects in the frame is likely to be a resistor and the resistor-object is likely to be of interest to a viewer. The location in the frame where a resistor was identified in 404 may be designated an area of likely viewer focus. In addition, audio close in time with the current frame or audio from other locations in the video may be analyzed to determine other content, such as that the video is an instructional video for making or repairing an electronic device (the subject or topic of the video), and that the current frame relates to a particular step in the process. In some embodiments, the context of the audio description, determined at 406, may indicate that the narrator is using their hands to identify an object of discussion. However, as explained below, it may be determined that the object is partially or completely blocked from view, resulting in a poor association or correlation between the audio and the current video frame.

The determination of the content of a frame using accompanying audio may be supplemented with an analysis the frame or multiple frames of the video with a machine learning model. The machine learning model may be trained with a plurality of videos. As a result of the training, the machine learning model may classify the video as being of a particular category or type and may classify the frame as being of a particular scene type. A video "type" may be defined by what is depicted in the video, e.g., a subject or topic, such as an instructional video. A "type" may be defined based on visual elements in the frame, such as a vehicle. Example video types include an instructional video for building or repairing an electric circuit, an instructional video for preparing an entrée or a dessert or other food item, an instructional video for teaching how to play a guitar, piano or other musical instrument, or an instructional video for preparing for an exam, such as a college entrance exam, an instructional video for showing how to repair an automobile, or an instructional video for making a craft item. Other types may relate to travel or sports. By classifying a video as being a particular type and a scene as a particular scene type, the content of the video may be better understood.

The determination of the content of a frame may include determining or detecting one or more focus indicators. A "focus indicator" is an indicator of where a viewer likely focuses his or her attention. Viewer focus indicators may include changes in the visual focus. Focus indicators may be determined from correlations between an object and a portion of audio, e.g., a spoken verbal cue (narrator refers to object appearing in a frame that is correlated in time with the speech). Focus indicators may also be determined from visual cues, e.g., narrator points to or touches object appearing in a frame, camera zooms in on an object. A change from an area determined to be a likely area of viewer focus to another area of focus is itself a focus indicator, e.g., narrator is referring to a first object, stops, and starts discussing a second object. The focus indicators may also be acquired through recording markers and from objects that the lens is focused on. Applications such as the OpenCV tool may be used to detect objects, motion, and the quality of the object. Blur detection may also be accomplished using OpenCV and a technique such as Laplacian smoothing and accumulating the variances.

The information identified and determined in operations 404 and 406 may be stored in a multi-dimensional dataframe. In various embodiments, one dataframe for each frame of the video is contemplated. In some embodiments, fewer dataframes may be used, such as where the scene does not change from one frame to the next. Dataframes may be stored in the database 308. A software library such as pandas may be used for data manipulation and analysis. Dataframes may be organized primarily by the x-y-z position coordinates of the video and time. Each identified visual object is associated with a coordinate location in the dataframe. Each coordinate in a frame may include an attribute field, such that a map of the video in data fields is generated.

Examples of the attributes that may be stored in a dataframe include the dimensions of the frame, usually measured as x-y-z coordinates, the presence of objects in the frame, a trajectory, depth, position, or identification of objects in the frame, e.g., whether the object is a person, place or thing. Detected aspects of image quality may be stored as attributes, such as sharpness, blur, noise, color, contrast, distortion, possible lens flare, any video compression artifacts, glare, and lighting attributes, e.g., whether the video recording is too light or too dark. Any focus indicators that are determined may be stored as attributes.

At 406, the current frame is correlated with a reference frame. The reference frame may be the first frame of the video, a keyframe, i.e., a frame marked by a user, the first frame of a scene change, the frame associated with the end of a particular audio statement or other suitable frame. The reference frame captures an area of viewer focus. The quality of the reference frame should meet or exceed a quality threshold. To minimize processing, a reference frame may be selected in a localized area and overlap the related frames from a previous or subsequent reference frame or processed area. The reference frame may be the area of a frame containing an object of discussion. A marker may be added to the reference frame, such as frame 0 or 1, to indicate that the data in this specific frame is to represent the reference frame. Both the current frame and the reference frame have associated multi-dimensional dataframes. At 406, the dataframes of the current and reference frames are correlated.

As mentioned above, dataframes may be organized primarily by the x-y-z position coordinates of the video and time. Each coordinate in a dataframe may include an attribute field. Object positions and associated data in the multi-dimensional dataframe for the current or reference frames may be positioned based on object shape, size or color. The dataframe may anchor the scene where there is the most object coverage, or greatest subset match, in the x-y-z coordinate sequence. When correlating the current frame with the reference frame, if the object is a person, the position of the person may be correlated first. A thing being manipulated by the person may be correlated second. Other objects in the frame may then be correlated. Once correspondence between objects in the current and reference frames is established, the frames may be compared to determine whether transitions have occurred in the video and whether the transitions degrade video quality.

At 406, it is determined if the current frame results in a visual transition in the video. If there is a visual transition, it is determined if the quality of the video falls below a threshold. The determination of whether quality is below a threshold may be made on an object by object basis. A comparison of a quality metric to a threshold may be made on an objective or subjective basis. An objective comparison may be or may be similar to a signal to noise ratio. For example, if 60% of a particular object is obscured by another object, then the measure of noise is 60% and the amount of signal is 40%. As another example, if a particular object in the current frame is blurred, an unblurred version of the same object from the reference frame may be blurred in steps until it matches the object in the current frame. If object clarity changes from sharp focus to blurred in ten steps, and two steps are required to match the object in the current frame, the object is determined to be 20% blurred or to contain 20% noise.

A subjective comparison may be made using a model. In a preprocessing operation, a number of training videos— videos that are different from the video being analyzed or captured—are evaluated by human viewers. Preferably, a large number of videos are evaluated ("historical videos"). The historical videos are then rated by the human viewers. For example, a particular video (or a particular scene) may be evaluated by 5 persons, with 4 of the persons rating the video as understandable or clear. Another video (or a particular scene) may be evaluated by 5 persons, with only 1 person rating the video as understandable or clear. The quality metric for the former video is 80%, while the metric for the latter is 20%. The historical videos and scenes are classified by a machine learning model according to type. The type and the human interaction score may be stored in a database 308. The type and the human interaction score may be used as training data for a machine learning model, which may be a multi-vector/multi-target regression model. In various embodiments, the model may be a support vector machine (SVM). In various embodiments, the model may be a supervised machine learning model.

In addition to using historical videos assigned graded ratings in the model, in some embodiments, "likes" and other similar reactions to a video may used to rate a historical video. In some embodiments, viewer comments or adjectives in viewer comments on a video sharing platform, such as "awesome" or "terrible" may be used to rate a historical video.

The current frame of the video under analysis may also be classified by the machine learning model according to type. Once the type of current frame is known, it may be compared with frames of historical videos of similar type. If the current frame is determined to be similar to frames of a historical video, the human rating for the historical video may then be used to infer a rating for the frame under analysis. For example, if the current frame is of the auto repair type and several frames from historical videos of the auto repair type are found, the current frame and the found historical frames are compared. Assume a historical frame is found showing an engine compartment that is visually similar to the current frame, which shows an engine compartment of a similar vehicle from a similar angle, with a person positioned in a similar location referencing a similar engine part. Because the historical frame and the current frame are determined by the machine learning model to be sufficiently similar, the quality rating for the historical frame, e.g., 10%, may be imputed to the current frame. Thus, a machine learning model may be used to determine a subjective threshold for a quality metric for videos or video scenes being evaluated according to various embodiments.

At 410, a determination is made as to whether the quality of frame or an object of viewer focus in the frame is below a quality threshold. At 412, if the frame is of sufficient quality, a next frame is processed. The method may return to operation 403 if a currently recorded video is being evaluated or fetch a next frame of the existing video received at 402. If quality is below the threshold, it is determined at 414 whether a currently recorded video is being evaluated. If an existing video received at 402 is being evaluated, it is determined at 416 whether any of the methods described below may be used to modify the frame to improve the quality metric so that it is above the threshold. If the frame can be improved, the frame is altered at 418. If the frame cannot be improved using one of the methods described below, explanatory information may be added to the video at 420. Referring again to 414, if a currently recorded video is being evaluated, an alert is generated at 412.

In various embodiments, alteration of a video in response to determining that the quality of the video is below a threshold may include changing the orientation of some or all of the frames of the video. The video remediation module 320 may alter an orientation of the display of the current frame, e.g., the orientation of one or more frames of the video may be flipped, reflected, or rotated. Orientation may be changed in any suitable direction. The video remediation module 320 may store viewer preferences, including a preferred orientation for a specific viewer, and indicate likely confusion related to spatial and trajectory changes which could lead to confusion. For instance, if the current video recording is a training video for repairing the steering column on a right-hand drive car and a viewer wishes to perform the same action on a left-hand drive car where the steering column is on the other side of the car, the orientation of the current video recording may be flipped such that the steering column appears to be on the opposite side of the car. FIGS. 5 and 6 show examples of how altering a video by changing the orientation of one or more frames may raise the quality metric for the video (or portion of the video) so that it is above the threshold.

Figure 5A:
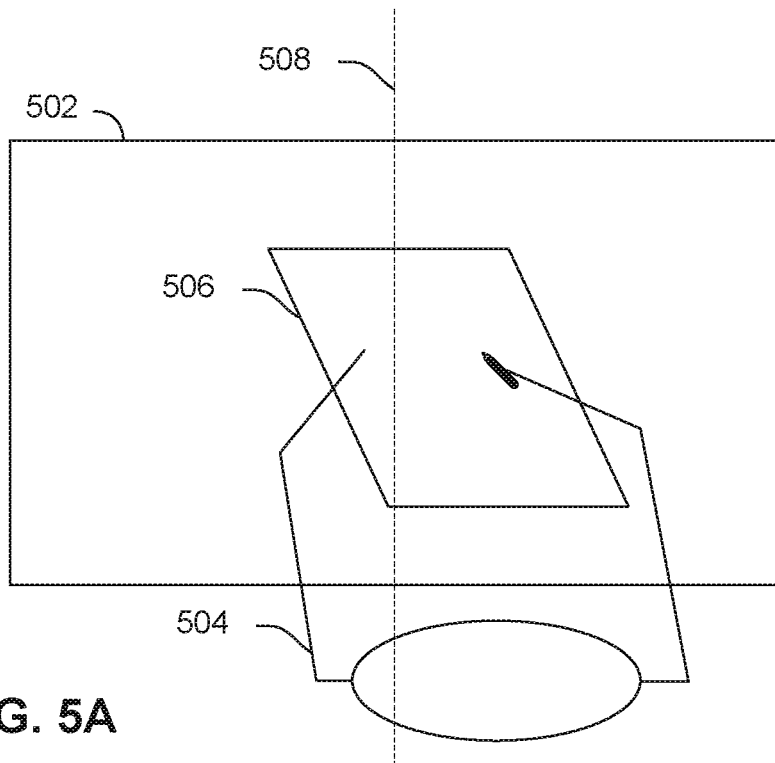
FIGS. 5A and 5B depict an orientation flip of 180 degrees for a displayed image along a vertical axis according to an embodiment.
Figure 5B:
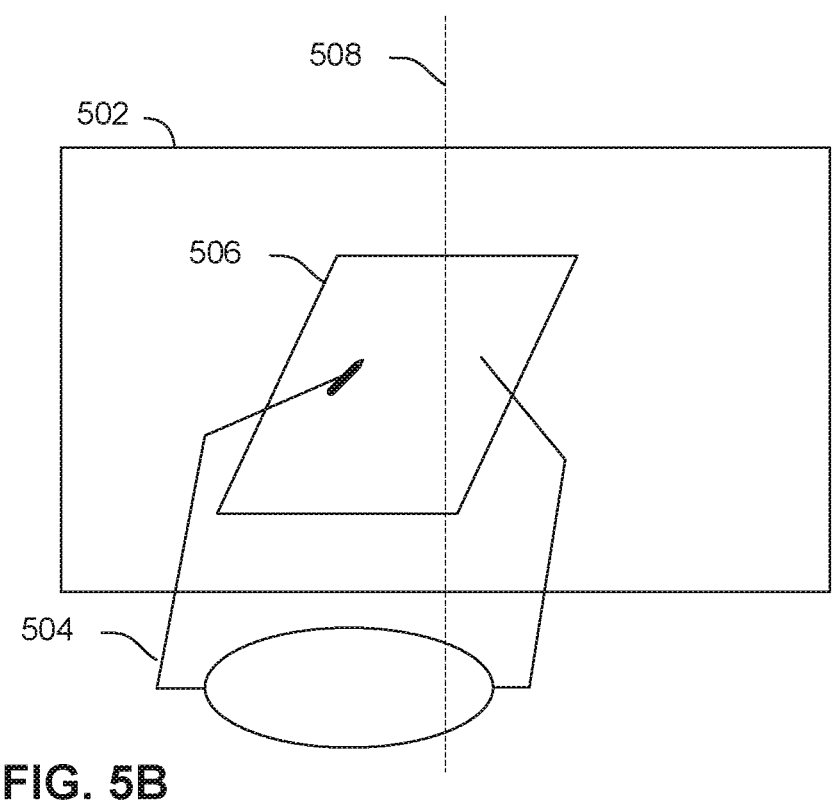

Referring to FIGS. 5A and 5B, an example is shown of a video for teaching handwriting to children. FIG. 5A shows a frame as captured. FIG. 5B shows the same frame after modification according to one embodiment. The frame of the image 502 contains a child 504 who is writing on a surface 506. FIG. 5A shows a child who is right-handed but an instructor may desire to use the video with a child who is left-handed. Right or left handedness may be indicated as a preference in a profile. The preference may be accommodated by flipping the orientation of the image 502. This flipping of orientation may be achieved by rotating or reflecting the image about a vertical axis in the center of the image depicted by the line 508. It should be noted that the line 508 is not actually in the video but is rather included to illustrate the axis along which the image 502 may be rotated. The resulting image 502 of FIG. 5B creates a mirror image of the frame in FIG. 5A to place the writing hand of the child on the left side and simulate a left-handed instructional video.

Figure 6A:
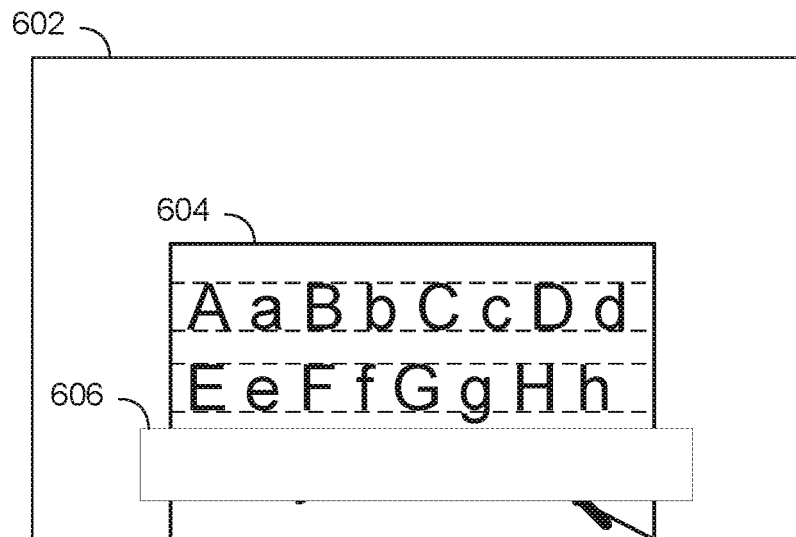
FIGS. 6A and 6B depict an orientation rotation of 90 degrees counterclockwise for a displayed image according to an embodiment.
Figure 6B:
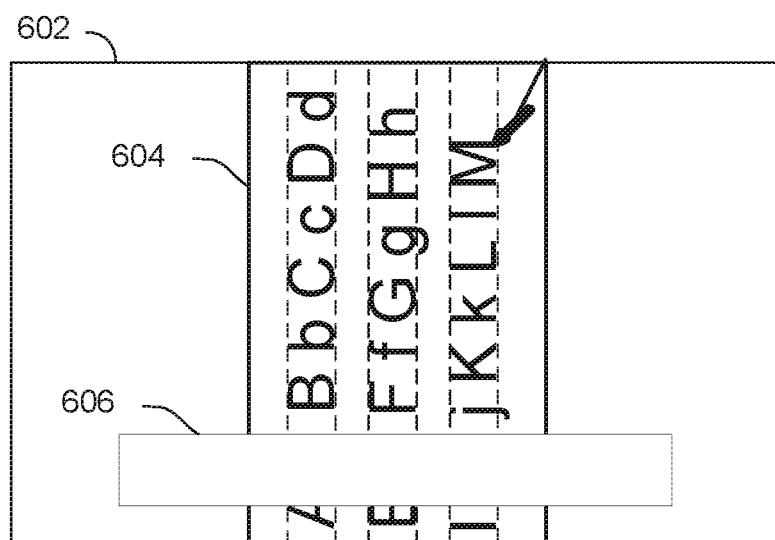

Referring to FIGS. 6A and 6B, an example is shown of another video for teaching handwriting to children. FIG. 6A shows a frame 602 as captured. FIG. 6B shows the same frame 602 after modification according to one embodiment. In this example, it may be determined that the quality of the video is below the threshold and also that the cause of the degradation of quality is an overlaid object such as a banner advertisement or other graphic 606 that is obscuring the portion of the writing 604 that is being discussed by the narrator in the video, which may be a determined likely focus of viewer. The likely focus of viewer may be where the letter "M" is printed based in part on the speaker describing how to make a letter "M". In this case, the dataframe for the video image may be analyzed and it may be determined that a rotation of 90 degrees in the plane of the image may allow the viewer to see the obscured text. The image may be rotated to achieve the image of FIG. 6B, which shows the area where the letter "M" is printed no longer being obscured by the overlaid object.

In some embodiments, it may be determined when recording a video that the quality of the video may be improved by changing the orientation of some or all of the frames of the video. If it is determined that video quality may be improved at recording time, an alert may be communicated to a camera operator at the time of video recording. The alert may suggest changing the orientation of the camera.

Moving objects that are detected in previous frames may also be used to respond to degraded quality and boost the multimedia experience, i.e., if a current frame is evaluated as having a quality metric below a threshold, the current frame may be modified so that the quality metric is improved to be at or above the threshold. Improvement in quality may be achieved by digitally repositioning an object within a frame or inserting an object into the frame.

For example, a table may be identified in a reference frame as being at a particular location, e.g., x-y-z coordinate position. In a subsequent frame, it may be determined that the table has moved out of frame. If a table is detected in the reference frame of the video through recognition techniques and it is determined that the table is an object that a viewer is likely to be focused on, then when it sees in a subsequent frame that the table has been removed, the quality metric that is calculated for the current frame is below the threshold. In response, the current frame may be modified to increase the quality metric of the current frame. In an embodiment, if this transition causes the quality to fall below the threshold, an appropriate position for the table may be calculated, e.g., its position in the reference frame, and the table may be placed or inserted in the current frame of the video in that position.

Another example of quality degradation may be severe glare at a particular x-y-z coordinate position, such that an object cannot be seen clearly. If this object is determined to be likely for the viewer to focus on, evaluation of the current frame would indicate that the object the viewer of focus is rendered with a quality metric below a threshold. Note that the remainder of the frame may have a quality metric above the threshold. In this case, the particular x-y-z coordinate position in the current frame may be modified so that its quality metric is at or above the threshold. This may be accomplished by placing the object obscured by glare at a different coordinate location in the frame or by overlaying an image of the object at the present location of the object. The image of the object may be copied from an earlier frame that was not subject to glare.

In another example, the narrator or speaker may refer to an object in the video. If the object is moved out of frame, references that the speaker makes to the out-of-frame object over a period of time may be analyzed and used to classify the degree of quality during that time. For example, if the speaker makes many references to the out-of-frame object and it is determined that the object is a focus of discussion, the quality may be found to be degraded. On the other hand, if audio references to the out-of-frame object are few or none and it may be determined that the object is not a focus of discussion, and it may be determined that quality is not or is only minimally affected by the object being out of frame.

As noted above, one technique for modifying a frame having a quality metric below a threshold due to an object of likely interest to a viewer being not clearly visible is to digitally move the position of the object within the frame or digitally insert the object into the frame. As one of ordinary skill will appreciate, an object of likely interest to a viewer is comprised of pixels and the location of the object in the frame is defined by coordinates. Pixel values are numeric and are typically stored in an array, e.g., a frame buffer, according to their x-y position in a frame. According to embodiments, various operations may be performed on the pixels within this region of the frame once they have been identified. The operations may include copying pixels from one location in a first frame to another location in a second frame. The operations may include deleting or adding pixels in order to reduce or enlarge the size of an object or frame. The operations may include replacing pixels removed from a region with other pixels. Any known image editing operations on pixels may be employed to achieve the goals of the present embodiments.

The quality threshold may be a consistent or inconsistent calculation which indicates a problem with the video. The quality threshold may be a minimum threshold per topic. Various embodiments may model pixel widths around the capture area, e.g., border areas, as having lower probabilities for quality than areas at the center of the frame. These border areas may be designated areas for banners and watermarks due to the lower probability that low quality in these areas will affect the overall quality of the video.

In alternative embodiments, regulated industry recordings may automatically remove videos that are out of focus and videos that pose risks. For instance, a procedure or patient simulation which is out of view or not oriented in the same view as the trainee or reviewer may be removed from a video sharing platform as described further below, e.g., a recording of grand rounds with medical students having a low quality metric.

Various embodiments may extract the changes and dynamism of a specific x-y-z coordinate area in a video over a period of time (i.e., a sequence of frames) and the associated quality for the x-y-z coordinate area.

Some embodiments may be used with a video sharing platform. A process for uploading a video may be modified to include evaluating a video according to the embodiments described herein. The quality of a video may be evaluated on the client-side device prior to uploading by a video creator or on the server side after uploading but prior to the video being made available on the video sharing platform. If it is determined that the quality of one or more portions of a video falls below a threshold, a message may be displayed to the video creator or uploader. The message may describe the results of the quality evaluation, such as what portions of the video are below the quality level and the reasons for the determination. In an embodiment, the message may be a warning to a user uploading the video to the Internet, such as "Do not proceed with posting or the video may be demonetized". In another embodiment, a visual indicator may be overlaid on a portion of the video falling below a threshold. The indicator may be, for example, a prohibition sign, such as the circle-backslash symbol, i.e., a circle with a 45-degree diagonal line drawn through it. In some embodiments, the video sharing platform may block or prevent posting of a video that includes one or more portions of a video that fall below a threshold. The threshold may change over time and in some embodiments, a posted video may be evaluated months or years after an original posting date. If the evaluated quality is below the current threshold, the video may be taken down. Because advertisers on a video sharing platform may provide compensation to a video creator, the determination of whether a video satisfies a quality threshold may be used to associate video quality with revenue. Only videos that have quality above the threshold may be compensated, while videos below the quality threshold may be ineligible for compensation or may not appear on the platform.

In addition to detection of an object that obstructs for an area of likely viewer interest, other artifacts may be detected. For example, poor image quality due to improper transcoding in a video, where the video standard, bit rate or frame rate may be incorrect or has errors, may be detected.

Figure 7:
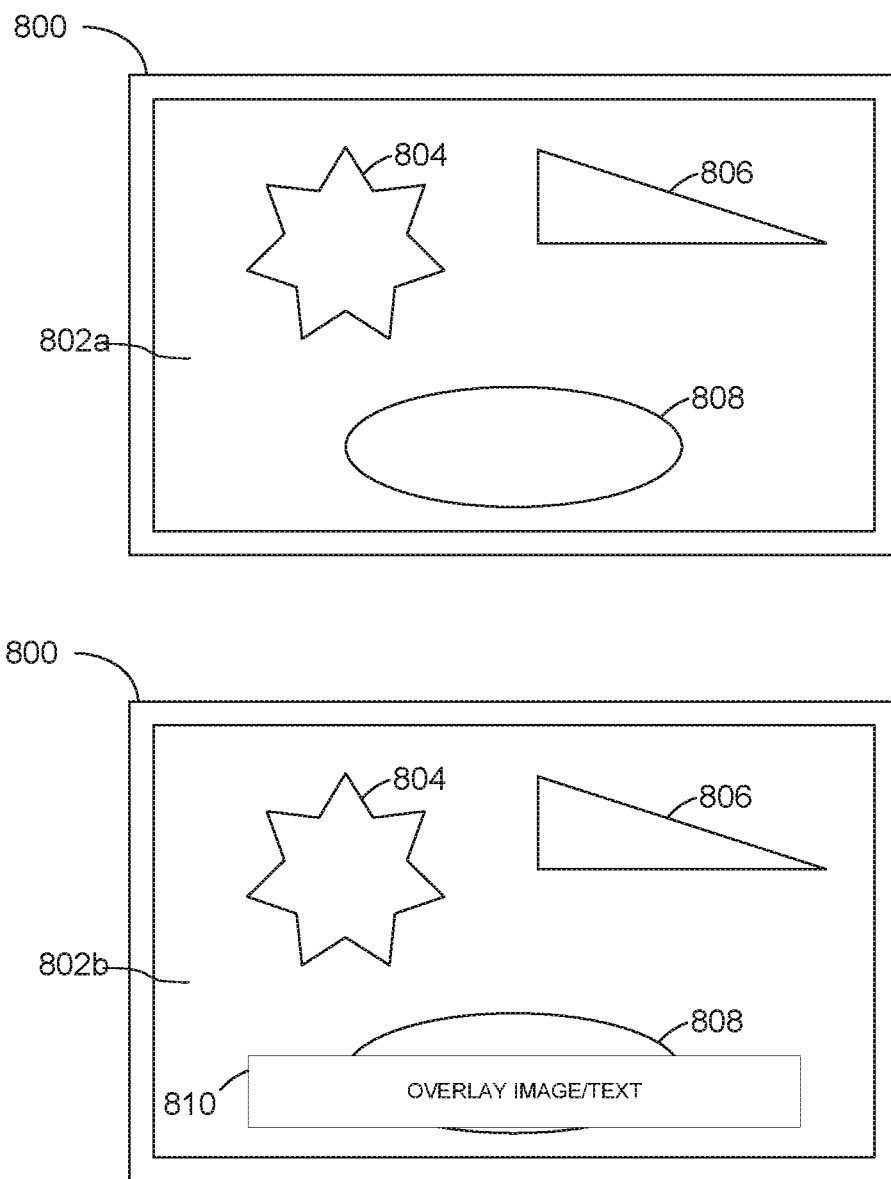
FIG. 7 depicts a display device rendering an image before and after an overlay is superimposed on the image in accordance with an example.

FIG. 7 depicts a display device 800 rendering an image or frame 802 before and after an overlay is superimposed on the frame. The image 802 includes objects 804, 806, and 808. The image 802*a* may be correspond with a reference frame or any frame of a plurality of frames from a video prior to a current frame. A quality metric may be determined for the reference frame or each of the plurality of frames. It may be determined that object 808 is a main object or subject of the video based on object recognition and audio analysis techniques. A coordinate area surrounding and including object 808 may be determined to be an area of likely viewer focus. When the current image or frame 802*a* is evaluated, the quality metric may be determined to be at or above a threshold. In the image 802*b*, an overlay 810 is superimposed on the image. When the current frame is 802*b*, the quality metric may be determined to be below the threshold. In response to determining that the quality metric of the current frame is below the threshold, the current frame may be modified so that the quality metric is at or above the threshold. In various embodiments, the modification may move or relocate an object located in an area of likely viewer focus so that it is not obscured by the overlay.

Figure 8:
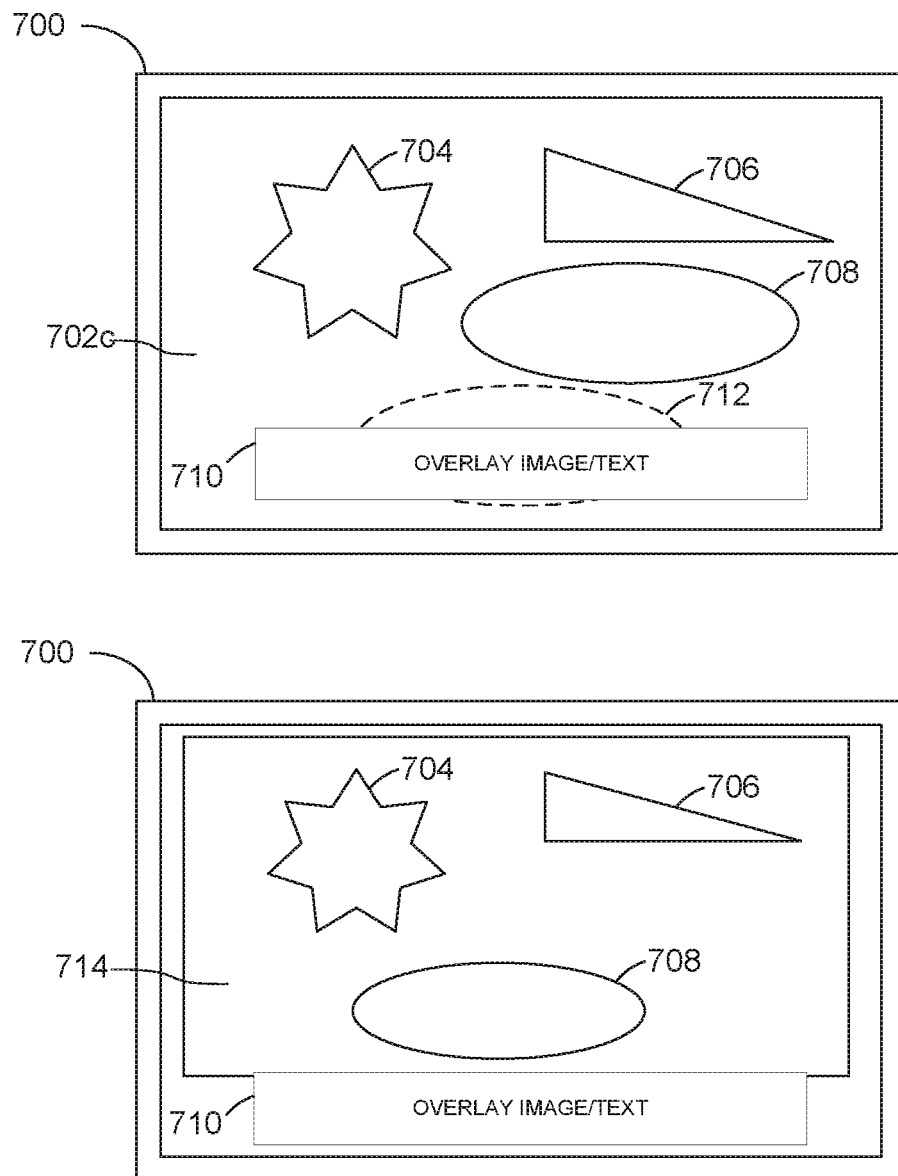
FIG. 8 depicts a display device rendering images that have been modified to improve a quality metric according to various embodiments.

FIG. 8 depicts a display device 700 rendering images 702*c* and 714 that have been modified to improve a quality metric according to various embodiments. As noted above, the coordinate area surrounding and including object 708 in image 702*a* may be determined to be an area of likely viewer focus. The area of likely viewer focus has a first coordinate location. When an overlay is received for displaying in a plurality of frames, a second coordinate location for the overlay may be specified. The determination of a quality metric for the current frame may include determining whether the overlay 710, at the specified location, will obscure an area of likely viewer focus. The modifying of the current frame so that the quality metric is at or above the threshold, in some embodiments, includes rendering the overlay at the specified second coordinate location, but also rendering the area of likely viewer focus at a third coordinate location. The third location is different from the first coordinate location where the object in an area of likely viewer focus was initially rendered. The third location is also different from the second coordinate location where the overlay is specified to be rendered. In FIG. 8, the first location may surround and include the dotted line 712, i.e., the location where object 708 was originally rendered. In FIG. 8, the third location is above and slightly to the right of the first location. Object 708 is digitally rendered at or moved to the third location, thereby improving the quality metric.

In some embodiments, the modification of an image to improve a quality metric may include resizing or scaling an image or resizing an object within the image. As shown in FIG. 8, the image 702*c* is rendered at a first scale in a current frame. In the example of FIG. 8, frame 702*c* fills the entire screen of display device 700. In response to a quality metric being below a threshold, the size of current frame 702*c* may be reduced to form frame or image 714, which has a second scale (the second scale is smaller than the first, original scale). When the image 714 is resized, the area of likely viewer focus is included in the resized image. The resized frame 714 may be rendered on the screen of display device 700 at the second, smaller scale. As may be seen in FIG. 8, when the image 714 is resized, the entire image may be repositioned so that the overlay 710 no longer obscures the object 708 in the area of likely viewer focus. In the example of FIG. 8, an entire image is resized. However, it should be appreciated that in some embodiments, only an object in the area of likely viewer focus, e.g., object 708, may be resized. Further, it should be appreciated that the two techniques for overcoming quality degradation due to an overlay may be combined, i.e., the object in the area of likely viewer focus may be both repositioned and resized.

In alternative embodiments, the video remediation module 320 may position advertisements at the top, bottom, side or in a reference to an object obscured by an overlay. Extraneous object references and annotations may be positioned at the border of the image, e.g., objects that have escaped focus. The depth and position of overlays may be evaluated in real time as the overlay is positioned on the screen. An overlay may be a banner or subtitle. An overlay may be text, image, or video. The depth and position of real-time overlays may be evaluated in real-time as they are positioned on the screen.

According to various embodiments, an action to improve the quality metric of a video may be taken at the time of video capture or recording. In some embodiments, an alert may be communicated to a camera operator at the time of video recording.

FIG. 9 depicts a display device 700 rendering objects scored according to likelihood of viewer focus the according to various embodiments. As described herein, objects within a frame are identified and a determination is made as to how important each object is to a viewer understanding the video. The determination of importance may be quantified with a weight or score. FIG. 9 shows objects 902, 904, 906, 908, and 910 being partially or completely rendered within the frame displayed on display device 700. The score assigned to an object is shown on each object in the figure for ease of explanation (the scores would not be shown in an actual display). In this example, objects 904 and 910 are determined to be the most important objects for a viewer to see in order to understand the video and are assigned a score of 5. Objects 904 and 910 may be the subject or topic of the video. Objects 904 and 910 may be referred to by a speaker or narrator and are the most likely objects that a viewer want to see. Objects 902, 906, and 908 are assigned scores of 3, 2.5, and 2 respectively. The least likely of these objects that a viewer might want to see is object 908, which is assigned a score of 2. Portions of rectangular objects 904 and 910 are out of view of the camera or current frame as shown by the dotted lines.

According to an embodiment, a center of likely viewer focus may be determined. The center may be determined in a variety of ways. In one implementation, the center of likely viewer focus may be calculated using the score assigned to an object. A central coordinate point for each object is determined to represent the object in the calculation. The central coordinate point, such as the center of circular object 902, has x-y values. The X coordinate of the center of likely viewer focus may be calculated by multiplying the weight of each object by its X coordinate value. The products would then be summed. The sum of the products is used as a numerator in a division operation. The sum of the weights of the objects serves as the denominator. The result of the division operation is the X coordinate of the center of likely viewer focus. In the example of FIG. 9, assume the respective X coordinates of objects of viewer interest 902, 904, 906, 908, and 910 are 5, 5, 14, 24, and 5. The numerator is calculated as 5*3+5*5+14*2.5+24*2+5*5=148. The denominator (sum of the weights) is calculated as 3+5+2.5+ 2+5=15.5. The X coordinate of the center of likely viewer focus is the result of the division: 148/15.5=9.55. The Y coordinate of the center of likely viewer focus is calculated in a similar manner. Once the x-y coordinates are determined, a point that is the center of likely viewer focus is known.

In the example of FIG. 9, the center of likely viewer focus is not in the center of display device 700, i.e., it is not in the center of the current frame being captured. When this situation occurs, it may be determined that the frame has a quality metric below a threshold. In response to determining the quality metric is below a threshold, an alert may be provided to the operator of the camera. The alert may communicate the point that is determined to be at the center of likely viewer focus. In some embodiments, the alert may take the form of a visual indication, such as circular visual indication 912 in FIG. 9. The circular visual indication 912 is centered on the point that is determined to be at the center of likely viewer focus. An operator of the camera would strive to keep the circular visual indication 912 in the center of the camera's field of view as shown on display 700. An operator of the camera seeing the circular visual indication 912 in the lower left portion of display 700 would understand that the camera needs to repositioned to center the indicator 912, for example, by pointing the camera to the left and down. This repositioning would bring the portions of rectangular objects 904 and 910 that are out of view of the camera back within view, thereby improving the quality metric for the current and subsequent frames. The alert 912 may be communicated to a camera operator at the time of video capture or recording.

The alert may take visual forms other than a circle, such as one or more arrows showing directions for repositioning the camera. The alert may be audible, such as suggestions spoken in machine generated speech. The alert may also take the form of a command or instruction to an apparatus for automatically positioning a camera. For example, a camera mounted to a tripod that has the camera's field of view set using servo motors capable of pointing the camera in the X, Y, and Z directions. As another example of machine-controlled positioning of a camera, the camera may be mounted on an unmanned terrestrial or aerial vehicle.

FIGS. 10 and 11 illustrate other examples in which an alert for quality improvement may be generated at the time of video recording. FIG. 10A is a side view of a camera 1002 capturing or recording frames of a video. Objects 1006 and 1008 are front of camera 1002. These objects are determined to be of likely interest to a viewer, e.g., based on the accompanying audio and recognition/identification of the objects. While object 1006 may have a high likelihood of being a viewer focus object, it is obscured by object 1004. Object 1004 may be of little or no importance to a viewer. Object 1004 could be a body part of the camera operator or narrator, such as an arm or hand. In response to determining that a quality metric is below a threshold, an alert to the operator of the camera or to an apparatus for controlling the camera's position may be generated at the time of capture. The alert may specify that the camera should be raised and tilted. FIG. 10B is a side view of the camera 1002 after it has been repositioned in response to the alert. In FIG. 10B, the object 1006 is in the camera's field of view and quality is improved.

FIGS. 11A-D show an animal 1102 moving along a path 1104 toward a large object 1106. The animal 1102 is the subject of the video and it is determined that the animal has a high likelihood of being an object of viewer focus. As the animal 1102 moves along the path 1104, it may be kept in the field of view without repositioning the camera, as shown in FIGS. 11A-C. This is because the camera is positioned at a sufficient distance from the object of interest to keep the object of interest in view. However, in FIG. 11D, the animal 1102 moves behind the large object 1106. In this scenario where the object of likely interest moves out of frame, an alert may be generated, instructing or suggesting that the camera be repositioned so that it can "see" around the corner behind the large object 1106. In addition, to providing up/down or left/right directions, the alert would instruct the camera to be move in the Z direction, i.e., into the depth dimension of the frame. In some embodiments, a camera recording a video is mounted on a vehicle with that is remotely controlled or which has some self-control capabilities. The camera's field of view may be controlled on vehicles of this type using servo motors, but also by repositioning the vehicle. In the example of FIG. 11, the camera may be mounted on a wheeled vehicle. When the alert is issued to the vehicle (or vehicle operator), the vehicle moves forward and turns to follow animal 1102. As another example, the camera may be mounted on an aerial vehicle. When the alert is issued to the vehicle (or vehicle operator), the vehicle again moves forward and turns to follow animal 1102.

In other embodiments, an alert for quality improvement generated at the time of video recording, an artifact may be introduced into the physical space that being filmed. As discussed, a border may be overlaid onto the screen as an indication of the object of discussion. The border is visible to the user of the recording device, but the border is not present in the physical space being filmed. In other embodiments, the border may be illuminated in the physical world using a light, laser pointer or outline indicating that an object (or the subject themselves) is out of frame. So that the illumination is only visible at recording time to a person in the video explaining what he or she is doing or to the person recording the video, the pixels of the illuminated border may be replaced after recording is complete, e.g., in post-production, with pixels matching the color of the scene that is illuminated with the border. Replacing pixels that are illuminated hides or removes the border from viewers from the video. Another technique for using an illuminated border and hiding its presence from viewers may be to keep the border just outside of the video frame, e.g., field of view of the camera, during recording. In some embodiments, a suitable position for an object may be determined when it is detected that the object is blocking the object of likely viewer interest, e.g., the object of discussion. The suitable position or location may be suggested in an alert or notification to the user recording the video. For example, a suggestion may be made to a narrator who is present in the field of view of the camera. It may be suggested that the narrator move in a certain way so the work being performed in the video recording is not blocked by the narrator. In an embodiment, an alternative position for an object obscuring an object or object of likely viewer interest, e.g., the area of discussion, may also be suggested to the narrator present in the field of view of the camera.

In another embodiment, re-recording the video may be enabled based on an alert, which may include an 8 second pre-roll to smooth any video transition and provide a linear recording. More specifically, if the quality metric is determined to be below the threshold and it is determined that a technique disclosed herein for improving quality would not raise quality by a sufficient amount, the alert, at recording time, may suggest re-recording a segment of the video.

In some situations, a decrease in quality of a recording over a number of frames of the same scene may be detected. The decrease in quality may be due to an object becoming blurred. In an embodiment, an alert at recording time may be generated to the camera operator instructing the operator to bring an object of likely interest to a viewer back into focus.

In various embodiments, in response to determining that video quality is degraded, a video recording may be altered to improve the quality by inserting explanatory information into the video. Specifically, a degradation in quality of the video is detected. A first degraded frame (first frame with quality metric below a threshold) is identified. A "last good" frame (frame with quality metric above the threshold) is identified. Explanatory information, which may be text or audio, is generated and included in expansion frames. A time slot in the video is created and the expansion frames are inserted into the time slot.

An example scenario is a video of a person describing how to repair or service a motor vehicle. At the start of the video segment, a vehicle engine compartment containing the engine is in the field of view of a camera. A person standing to the side announces the repair operation that he or she will perform. Subsequently, the person moves into the center of the frame taking a position partially blocking the vehicle engine compartment and states "First, I need to remove this thing." The person's body blocks the camera from capturing the component the person refers to. According to an embodiment, explanatory information is generated. In this example, the explanatory information may be: "A washer fluid reservoir is located at the front left corner of the engine compartment. It is a white tank with a black cap. This portion of the video shows the cap being removed with the person's hand. A special tool is not required." The explanatory information may be generated as text in the form of captions in a box. Alternatively, the explanatory information may be generated as audio, e.g., spoken words. The explanatory information is then included in expansion frames and the expansion frames are merged into the video. The explanatory information may be generated based on analysis of images and audio from elsewhere in the video (and context information) that identifies the washer fluid reservoir as being an area of likely viewer interest.

Continuing the example, a frame before the frame with the person's body blocking the camera may be selected as an expansion frame. This frame may also be considered the "last good frame." A time required to read the text is determined, e.g., 5 seconds. If the frame rate is 24 fps, 120 copies of the last good frame are generated as expansion frames and the explanatory text is superimposed on the 120 expansion frames. Alternatively, an audio track may be added to the expansion frames. The expansion frames are then merged into the video.

Figure 12A:
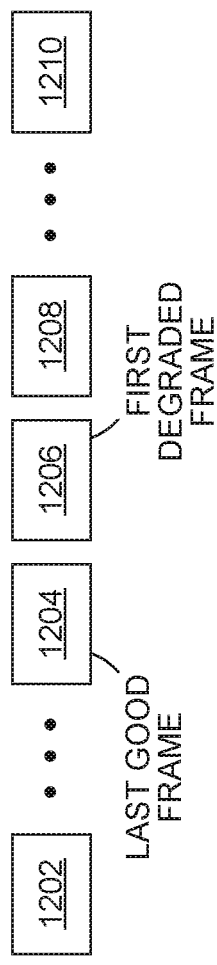
FIGS. 12A and 12B depict a process of merging expansion frames into a video according to an embodiment.
Figure 12B:
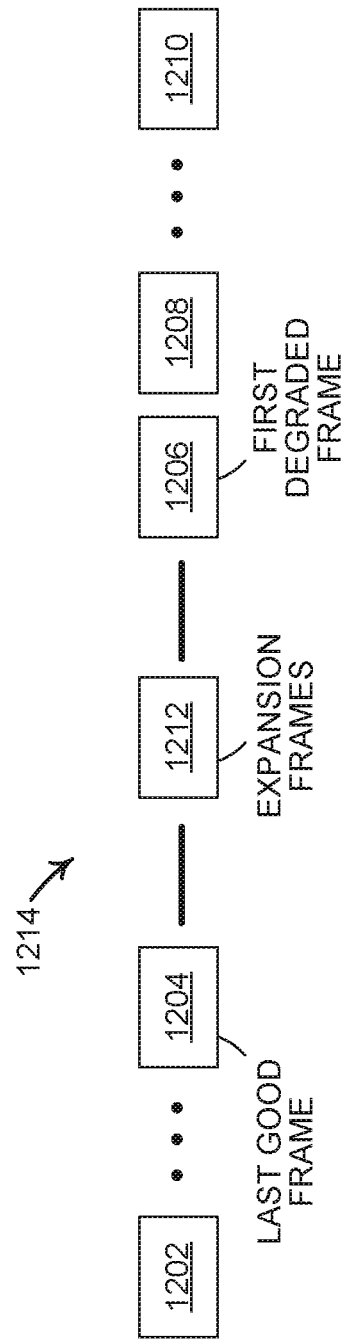

FIGS. 12A and 12B depict merging expansion frames into a video. FIGS. 12A and 12B show a video comprised of a sequence of frames 1202-1210. Frame 1202 may be an initial frame in a scene. Frames from 1202 to 1204 may have each a quality metric above the threshold. However, beginning with frame 1208, the quality metric is determined to be below the threshold. Frame 1204 may be identified as a last good frame and frame 1206 as a "first degraded frame." Explanatory information is generated as described above. Referring now to FIG. 12B, the explanatory information is included in or added to expansion frames 1212. A time slot 1214 in the video is created beginning with frame 1204 and ending with frame 1206. The expansion frames are inserted into the time slot. In the example of FIG. 12B, the time slot is inserted after the last good frame. In other embodiments, the time slot may be inserted after the first degraded frame.

An advantage of creating a time slot for expansion frames is that it reduces the information content in a segment of the video, making it easier for a viewer to understand. When a video includes a lot of visual information and a narrator is speaking rapidly, a viewer can be overwhelmed by the amount of information presented in a given segment. Expanding the time that a frame of the video is shown (or a frame is "frozen") while at the same time pausing the narrator's spoken presentation allows a viewer time to absorb the information. In addition, it allows time for the viewer to read any text explanation added to the frames. The explanatory information presented in the time slot additionally clarifies references to objects in the video that have been obscured by the narrator or another object.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a plurality of sequential frames of a scene in a video;
   generating dataframes for current frames and for a reference frame of the video;
   comparing the dataframes for the reference and current frames;
   determining a quality metric of the current frames based on the comparison of the dataframes for the reference and current frames;
   in response to determining that the quality metric of one of the current frames is below a threshold, determining if the quality metric can be improved by altering the video; and
   in response to determining that the quality metric can be improved by altering the video, inserting expansion frames into the video.

2. The computer-implemented method of claim 1, further comprising:
   receiving a plurality of videos and interaction data associated with frames of the respective plurality of videos;
   for each of the received plurality of videos, generating dataframes for the frames of the video and for one or more reference frames of the video;
   for each of the received plurality of videos, comparing the dataframes for the frames of the video with a corresponding reference frame;
   for each of the received plurality of videos, determining a quality metric for the frames of the video based on the comparison of the dataframes for the frames of the video with a corresponding reference frame and on interaction data associated with the respective frame;
   classifying each of the plurality of the received videos by type; and
   training a machine learning model with the received plurality of videos, the respective determined quality metrics, and respective classifications, wherein the determining a quality metric of the current frame is further based on the machine learning model.

3. The computer-implemented method of claim 1, further comprising generating explanatory information.

4. The computer-implemented method of claim 3, wherein the explanatory information is textual explanatory information, further comprising superimposing the textual explanatory information on a plurality of the expansion frames.

5. The computer-implemented method of claim 3, wherein the explanatory information is audio explanatory information, further comprising attaching the audio explanatory information to a plurality of the expansion frames.

6. The computer-implemented method of claim 1, wherein the expansion frames are inserted into the video after a last good frame.

7. The computer-implemented method of claim 1, wherein the plurality of sequential frames of a scene in a video are received from a camera at a time of capture, further comprising:
in response to determining that the quality metric cannot be improved by altering the video, generating a notification to change a position of the camera.

8. The computer-implemented method of claim 7, wherein the generating a notification to change a position of the camera comprises:
determining a center of likely user focus; and
illuminating a border around the center of likely user focus on the camera screen.

9. The computer-implemented method of claim 8, wherein the illuminating a border around the center of likely user focus comprises projecting the border using a light source.

10. A computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a plurality of sequential frames of a scene in a video;
generating dataframes for current frames and for a reference frame of the video;
comparing the dataframes for the reference and current frames;
determining a quality metric of the current frames based on the comparison of the dataframes for the reference and current frames;
in response to determining that the quality metric of one of the current frames is below a threshold, determining if the quality metric can be improved by altering the video; and
in response to determining that the quality metric can be improved by altering the video, inserting expansion frames into the video.

11. The computer system of claim 10, further comprising:
receiving a plurality of videos and interaction data associated with frames of the respective plurality of videos;
for each of the received plurality of videos, generating dataframes for the frames of the video and for one or more reference frames of the video;
for each of the received plurality of videos, comparing the dataframes for the frames of the video with a corresponding reference frame;
for each of the received plurality of videos, determining a quality metric for the frames of the video based on the comparison of the dataframes for the frames of the video with a corresponding reference frame and on interaction data associated with the respective frame;
classifying each of the plurality of the received videos by type; and
training a machine learning model with the received plurality of videos, the respective determined quality metrics, and respective classifications, wherein the determining a quality metric of the current frame is further based on the machine learning model.

12. The computer system of claim 10, further comprising generating explanatory information.

13. The computer system of claim 12, wherein the explanatory information is textual explanatory information, further comprising superimposing the textual explanatory information on a plurality of the expansion frames.

14. The computer system of claim 12, wherein the explanatory information is audio explanatory information, further comprising attaching the audio explanatory information to a plurality of the expansion frames.

15. The computer system of claim 10, wherein the expansion frames are inserted into the video after a last good frame.

16. The computer system of claim 10, wherein the plurality of sequential frames of a scene in a video are received from a camera at a time of capture, further comprising:
in response to determining that the quality metric cannot be improved by altering the video, generating a notification to change a position of the camera.

17. The computer system of claim 10, wherein the generating a notification to change a position of the camera comprises:
determining a center of likely user focus; and
illuminating a border around the center of likely user focus on the camera screen.

18. The computer system of claim 10, wherein the illuminating a border around the center of likely user focus comprises projecting the border using a light source.

19. A computer program product comprising:
a computer readable storage device storing computer readable program code embodied therewith, the computer readable program code comprising program code executable by a computer to perform a method comprising:
receiving a plurality of sequential frames of a scene in a video;
generating dataframes for current frames and for a reference frame of the video;
comparing the dataframes for the reference and current frames;
determining a quality metric of the current frames based on the comparison of the dataframes for the reference and current frames;
in response to determining that the quality metric of one of the current frames is below a threshold, determining if the quality metric can be improved by altering the video; and
in response to determining that the quality metric can be improved by altering the video, inserting expansion frames into the video.

20. The computer program product of claim 19, further comprising:
receiving a plurality of videos and interaction data associated with frames of the respective plurality of videos;
for each of the received plurality of videos, generating dataframes for the frames of the video and for one or more reference frames of the video;

for each of the received plurality of videos, comparing the dataframes for the frames of the video with a corresponding reference frame;

for each of the received plurality of videos, determining a quality metric for the frames of the video based on the comparison of the dataframes for the frames of the video with a corresponding reference frame and on interaction data associated with the respective frame;

classifying each of the plurality of the received videos by type; and training a machine learning model with the received plurality of videos, the respective determined quality metrics, and respective classifications, wherein the determining a quality metric of the current frame is further based on the machine learning model.

* * * * *